United States Patent
Yu et al.

(10) Patent No.: US 11,414,511 B2
(45) Date of Patent: Aug. 16, 2022

(54) CARBOXYMETHYL INULIN GRAFT POLYMER SCALE AND CORROSION INHIBITOR AND PREPARATION METHOD THEREOF

(71) Applicants: YANGTZE UNIVERSITY, Jingzhou (CN); PetroChina Company Limited, Beijing (CN)

(72) Inventors: Weichu Yu, Jingzhou (CN); Aibin Wu, Jingzhou (CN); Jingfeng Dong, Beijing (CN); Zhenhu Lyu, Beijing (CN); Zhichen Wang, Beijing (CN); Fengjuan Zhang, Beijing (CN)

(73) Assignees: YANGTZE UNIVERSITY, Jingzhou (CN); PETROCHINA COMPANY LIMITED, Beijing (CN)

( * ) Notice: Subject to any disclaimer, the term of this patent is extended or adjusted under 35 U.S.C. 154(b) by 348 days.

(21) Appl. No.: 16/863,562

(22) Filed: Apr. 30, 2020

(65) Prior Publication Data

US 2021/0198405 A1 Jul. 1, 2021

(30) Foreign Application Priority Data

Dec. 31, 2019 (CN) .......................... 201911416352.4

(51) Int. Cl.
*C08F 251/00* (2006.01)
*C23F 11/173* (2006.01)

(52) U.S. Cl.
CPC .......... *C08F 251/00* (2013.01); *C23F 11/173* (2013.01)

(58) Field of Classification Search
None
See application file for complete search history.

(56) References Cited

U.S. PATENT DOCUMENTS

| | | | |
|---|---|---|---|
| 9,051,406 B2* | 6/2015 | Rodrigues | B01J 20/264 |
| 2009/0291861 A1* | 11/2009 | Sawdon | C09K 8/08 |
| | | | 507/110 |
| 2012/0149625 A1* | 6/2012 | Simonsen | C11D 3/38663 |
| | | | 510/226 |
| 2013/0137799 A1* | 5/2013 | Rodrigues | C08F 2/38 |
| | | | 527/311 |

* cited by examiner

*Primary Examiner* — John J Figueroa
(74) *Attorney, Agent, or Firm* — WPAT, PC

(57) ABSTRACT

The invention discloses a carboxymethyl inulin graft polymer scale and corrosion inhibitor and a preparation method thereof. The main chain of the carboxymethyl inulin graft polymer scale and corrosion inhibitor consists of the following repeating unit (I):

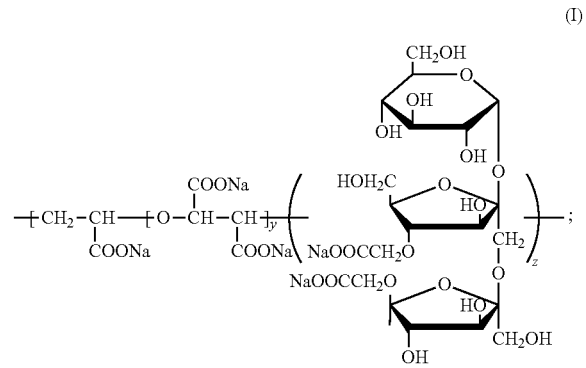

in the repeating unit (I), x:y=(20~80):(20~80); the range of z is from 2 to 70, the degree of carboxymethyl substitution is from 1.5 to 2.5. The beneficial effect of the technical scheme proposed in the present invention is: it has excellent scale inhibition and corrosion inhibition properties; the monomers are cheap and easily available; the reaction conditions are mild and easy to control; at the same time, the monomer raw materials don't contain phosphorus and nitrogen, and are environmentally friendly.

8 Claims, No Drawings

CARBOXYMETHYL INULIN GRAFT POLYMER SCALE AND CORROSION INHIBITOR AND PREPARATION METHOD THEREOF

FIELD OF THE DISCLOSURE

The disclosure relates to a carboxymethyl inulin graft polymer scale and corrosion inhibitor and a preparation method thereof.

BACKGROUND

Water treatment agent is a chemical agent necessary for industrial water, domestic water and waste water disposal. Its functions include: flocculation, corrosion inhibition, scale inhibition, sterilization, cleaning, defoaming, deodorization, decolorization, dispersion, softening, etc. The water quality meets the corresponding quality requirements. With the enactment of environmental protection laws in various countries in the world and the increasingly strict requirements, the research and application of various types of high-efficiency water treatment chemicals have been rapidly developed.

Nowadays, with the rapid development of industry, industrial water consumption is also increasing year by year, and the recycling of industrial water is one of the important means of saving water. However, the repeated use of circulating cooling water will cause the concentration of scaled ions in the water to increase continuously and cause scaling, resulting in a decrease in the heat exchange efficiency of the pipeline or even blockage, and a series of problems such as corrosion. At present, most of the water treatment agents widely used in industry contain phosphorus. Although their scale inhibition and corrosion inhibition effects meet the requirements, these phosphorus-containing compounds will eventually enter the water body with wastewater discharge, which will inevitably cause pollution and damage to the environment. Therefore, research on pollution-free water treatment agents is imminent.

Polyepoxy succinic acid (referred to as p(ESA)) is currently recognized as a pollution-free water treatment agent at home and abroad. It does not contain phosphorus and nitrogen, does not cause eutrophication of water bodies, and can be degraded to harmless by fungus and microorganisms. The product has both scale inhibition and corrosion inhibition functions, and the effect is good. However, polyepoxy succinic acid has limited scale inhibition performance for $Ca_3(PO_4)_2$, and it also needs to improve the dispersion performance of $Fe_2O_3$, the ability to stabilize zinc salts and the corrosion inhibition performance. Therefore, there is an urgent need for a synthetic polymer scale and corrosion inhibitor that can solve these problems and has excellent performance.

SUMMARY

The purpose of the present invention is to provide a carboxymethyl inulin graft polymer scale and corrosion inhibitor and a preparation method thereof for solving the problems of poor scale and slow release properties of water treatment agents in the prior art.

The main chain of the carboxymethyl inulin graft polymer scale and corrosion inhibitor consists of the following repeating unit (I):

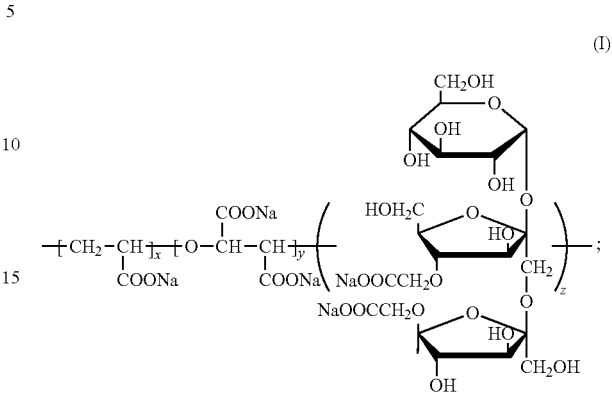

in the repeating unit (I), $x:y=(20\sim80):(20\sim80)$; the range of z is from 2 to 70, the degree of carboxymethyl substitution is from 1.5 to 2.5.

The preparation method of the carboxymethyl inulin graft polymer scale and corrosion inhibitor includes the following steps:

dissolving the sodium carboxymethyl inulin in water to obtain sodium carboxymethyl inulin aqueous solution, dissolving the emulsifier in the oil phase solvent and mixing with the sodium carboxymethyl inulin aqueous solution, and then mixing with $N_2$ to remove $O_2$ for 30 min;

after raising the temperature to the initiation temperature, the initiator is added to initiate the reaction for 60 min, and then the temperature is raised to the grafting temperature, and the sodium acrylate monomer and the sodium epoxy succinate monomer are added, and the graft polymer emulsion is obtained after 4~6 h of reaction;

the graft polymer emulsion is subjected to post-treatment, to obtain a carboxymethyl inulin graft polymer scale and corrosion inhibitor;

the molar ratio of the sodium acrylate monomer to the sodium epoxy succinate monomer is $(20\sim80):(20\sim80)$, the sugar chain polymerization degree of the sodium carboxymethyl inulin is from 2 to 70, and the degree of carboxymethyl substitution is from 1.5 to 2.5.

The beneficial effect of the technical scheme proposed in the present invention is: it has excellent scale inhibition and corrosion inhibition properties; the monomers are cheap and easily available; the reaction conditions are mild and easy to control; at the same time, the monomer raw materials don't contain phosphorus and nitrogen, and are environmentally friendly.

DETAILED DESCRIPTION OF PREFERRED EMBODIMENTS

For the first solution provided by the present invention, it is provided a carboxymethyl inulin graft polymer scale and corrosion inhibitor. The main chain of the carboxymethyl inulin graft polymer scale and corrosion inhibitor consists of the following repeating unit (I):

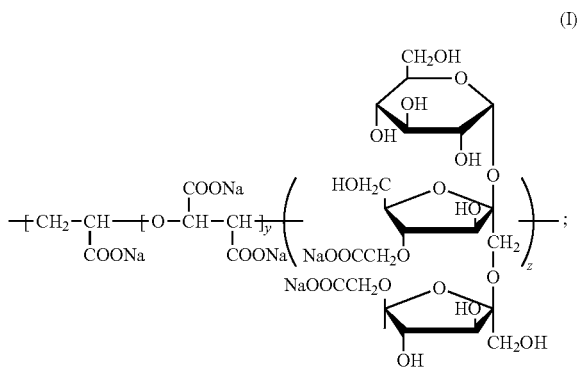

(I)

in the repeating unit (I), x:y=(20~80):(20~80), further preferably, the molar ratio of the two is (30~70):(40~70); the range of z is from 2 to 70, the degree of carboxymethyl substitution is from 1.5 to 2.5; further preferably, the range of z is from 10 to 60, the degree of carboxymethyl substitution is from 1.7 to 2.2.

For the second solution provided by the present invention, it is provided a preparation method of the carboxymethyl inulin graft polymer scale and corrosion inhibitor includes the following steps:

(1) Dissolving the sodium carboxymethyl inulin in water to obtain sodium carboxymethyl inulin aqueous solution, dissolving the emulsifier in the oil phase solvent and mixing with the sodium carboxymethyl inulin aqueous solution, and then mixing with $N_2$ to remove $O_2$ for 30 min. In this step, the molar ratio of the sodium acrylate monomer to the sodium epoxy succinate monomer is (20~80):(20~80), preferably the molar ratio of the two is (30~70):(40~70); the sugar chain polymerization degree of the sodium carboxymethyl inulin is from 2 to 70, preferably the range is from 10 to 60. The emulsifier is one or a mixture of oleic acid, sodium oleate, calcium oleate, magnesium oleate, Span-type emulsifier, Tween-type emulsifier and OP-type emulsifier, preferably choosing oleic acid/sodium oleate mixed system as the emulsifier. The oil phase solvent is one or a mixture of toluene, xylene, liquid paraffin and white oil, preferably choosing liquid paraffin as the oil phase.

(2) After raising the temperature to the initiation temperature, the initiator is added to initiate the reaction for 60 min, and then the temperature is raised to the grafting temperature, and the sodium acrylate monomer and the sodium epoxy succinate monomer are added, and the graft polymer emulsion is obtained after 4~6 h of reaction. In this step, the initiation temperature is 30~50° C., preferably 35~45° C.; the grafting temperature is 30~60° C., preferably 40~50'C. The initiator is one or a mixture of azobisisobutyronitrile, potassium persulfate, ammonium persulfate, urea, benzoyl peroxide, sodium dithionite, phosphotungstic heteropolyacid-chromium nitrate complex; in this embodiment, the initiator is a ternary complex composed of potassium persulfate, urea, phosphortungstic heteropolyacid-chromium nitrate complex, and the molar ratio of potassium persulfate, urea and phosphortungstic heteropolyacid-chromium nitrate complex is (5~15):(5~15):(1~6), preferably the molar ratio of the three is (7~12):(7~12):(2~4). In addition, in the step of adding sodium acrylate monomer and sodium epoxy succinate monomer, the volume ratio of oil phase to water phase in the solution is 1.2:1.

(3) The graft polymer emulsion is subjected to post-treatment, to obtain a carboxymethyl inulin graft polymer scale and corrosion inhibitor. In this step, the post-treatment specifically includes the following steps: the graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor.

The preparation method in the above second solution is used to prepare the carboxymethyl inulin graft polymer scale and corrosion inhibitor in the first solution, so the carboxymethyl inulin graft polymer in the above two solutions should be consistent in structure and function. The carboxymethyl inulin graft polymer scale and corrosion inhibitor is formed with respect to a single sodium carboxymethyl inulin, polyepoxy succinic acid, or epoxy succinic acid-acrylic acid polymers, or binary compound formed by any two of the above components, it has better scale inhibition and corrosion inhibition performance.

With reference to specific embodiments, the carboxymethyl inulin graft polymer scale and corrosion inhibitor and preparation method thereof of the present invention are further described in detail.

Example 1

(1) Adding 33 g sodium carboxymethyl inulin to 50 ml water, stirring and dissolving to obtain sodium carboxymethyl inulin aqueous solution; taking 5.76 g oleic acid and 3.84 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiati on temperature, the initiator that is a complex composed of 6 mg potassium persulfate, 1.3 mg urea and 19.6 mg phosphortungstic heteropolyacid-chromium nitrate complex, is added to initiate the reaction for 60 min; then raising the temperature to 40° C. grafting temperature, adding 11.5 g sodium acrylate and 21.5 g sodium epoxy succinate, the volume ratio of oil and water when mixing is 1.2:1, and carrying out graft polymerization reaction for 6 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor I.

Example 2

(1) Adding 25 g sodium carboxymethyl inulin to 50 ml water, stirring and dissolving to obtain sodium carboxymethyl inulin aqueous solution; taking 4.8 g oleic acid and 4.8 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiati on temperature, the initiator that is a complex composed of 9 mg potassium persulfate, 2.0 mg urea and 19.6 mg phosphortungstic heteropolyacid-chromium nitrate complex, is added to initiate the reaction for 60 min; then raising the temperature to 40° C. grafting temperature, adding 8.7 g sodium acrylate and 16.3 g sodium epoxy succinate, the volume ratio of oil and water when mixing is 1.2:1, and carrying out graft polymerization reaction for 6 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor II.

Example 3

(1) Adding 20 g sodium carboxymethyl inulin to 50 ml water, stirring and dissolving to obtain sodium carboxymethyl inulin aqueous solution; taking 4.0 g oleic acid and 5.6 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiati on temperature, the initiator that is a complex composed of 13 mg potassium persulfate, 2.9 mg urea and 19.6 mg phosphortungstic heteropolyacid-chromium nitrate complex, is added to initiate the reaction for 60 min; then raising the temperature to 40° C. grafting temperature, adding 4.5 g sodium acrylate and 15.5 g sodium epoxy succinate, the volume ratio of oil and water when mixing is 1.2:1, and carrying out graft polymerization reaction for 6 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor III.

Example 4

(1) Adding 26 g sodium carboxymethyl inulin to 50 ml water, stirring and dissolving to obtain sodium carboxymethyl inulin aqueous solution; taking 6.2 g oleic acid and 3.4 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiati on temperature, the initiator that is a complex composed of 10 mg potassium persulfate, 2.0 mg urea and 19.6 mg phosphortungstic heteropolyacid-chromium nitrate complex, is added to initiate the reaction for 60 min; then raising the temperature to 40° C. grafting temperature, adding 12.5 g sodium acrylate and 13.5 g sodium epoxy succinate, the volume ratio of oil and water when mixing is 1.2:1, and carrying out graft polymerization reaction for 6 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor IV.

Example 5

(1) Adding 28 g sodium carboxymethyl inulin to 50 ml water, stirring and dissolving to obtain sodium carboxymethyl inulin aqueous solution; taking 6.9 g oleic acid and 4.6 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 40° C. initiati on temperature, the initiator that is a complex composed of 6 mg potassium persulfate, 2.0 mg urea and 14.5 mg phosphortungstic heteropolyacid-chromium nitrate complex, is added to initiate the reaction for 60 min; then raising the temperature to 50° C. grafting temperature, adding 10.5 g sodium acrylate and 17.5 g sodium epoxy succinate, the volume ratio of oil and water when mixing is 1.2:1, and carrying out graft polymerization reaction for 4 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor V.

Example 6

(1) Adding 30 g sodium carboxymethyl inulin to 50 ml water, stirring and dissolving to obtain sodium carboxymethyl inulin aqueous solution; taking 5.76 g oleic acid and 3.84 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 38° C. initiati on temperature, the initiator that is a complex composed of 6 mg potassium persulfate, 2.0 mg urea and 10 mg phosphortungstic heteropolyacid-chromium nitrate complex, is added to initiate the reaction for 60 min; then raising the temperature to 45° C. grafting temperature, adding 9.5 g sodium acrylate and 20.5 g sodium epoxy succinate, the volume ratio of oil and water when mixing is 1.2:1, and carrying out graft polymerization reaction for 4 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor VI.

Example 7

(1) Adding 30 g sodium carboxymethyl inulin to 50 ml water, stirring and dissolving to obtain sodium carboxymethyl inulin aqueous solution; taking 5.76 g oleic acid and 3.84 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiati on temperature, the initiator that is a complex composed of 6 mg potassium persulfate, 1.5 mg urea and 15 mg phosphortungstic heteropolyacid-chromium nitrate complex, is added to initiate the reaction for 60 min; then raising the temperature to 45° C. grafting temperature, adding 10 g sodium acrylate and 20 g sodium epoxy succinate, the volume ratio of oil and water when mixing is 1.2:1, and carrying out graft polymerization reaction for 4 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor VII.

Example 8

(1) Adding 30 g sodium carboxymethyl inulin to 50 ml water, stirring and dissolving to obtain sodium carboxymethyl inulin aqueous solution; taking 5 g oleic acid and 4.6 g sodium oleate as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiation temperature, the initiator that is a complex composed of 9 mg potassium persulfate, 1.3 mg urea and 12 mg phosphortungstic heteropolyacid-chromium nitrate complex, is added to initiate the reaction for 60 min; then raising the temperature to 45° C. grafting temperature, adding 9 g sodium acrylate and 21 g sodium epoxy succinate, the volume ratio of oil and water when mixing is 1.2:1, and carrying out graft polymerization reaction for 4 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor VIII.

Example 9

(1) Adding 30 g sodium carboxymethyl inulin to 50 ml water, stirring and dissolving to obtain sodium carboxymethyl inulin aqueous solution; taking 5.5 g oleic acid as emulsifiers, dissolving in 60 ml liquid paraffin, then mixing with the sodium carboxymethyl inulin aqueous solution, and passing $N_2$ to remove $O_2$ for 30 min.

(2) After raising the temperature to 35° C. initiation temperature, the initiator that is a complex composed of 9 mg potassium persulfate, 1.3 mg urea and 15 mg phosphortungstic heteropolyacid-chromium nitrate complex, is added to initiate the reaction for 60 min; then raising the temperature to 48° C. grafting temperature, adding 8 g sodium acrylate and 22 g sodium epoxy succinate, the volume ratio of oil and water when mixing is 1.2:1, and carrying out graft polymerization reaction for 4 h to obtain graft polymer emulsion.

(3) The graft polymer emulsion is repeatedly washed in acetone or ethanol and dried under vacuum at 40~60° C. to obtain the crude product; the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor IX.

Test Example 1

In order to evaluate the scale and corrosion inhibition effect of the carboxymethyl inulin graft polymer scale and corrosion inhibitor prepared in the above examples, the test water (A~E) was first prepared to obtain test water with different parameters, such as Table 1 shows.

TABLE 1

Test water A~E parameters

| Test water | Calcium hardness (mg/l) | Total alkalinity (mg/l) | Total hardness (mg/l) | Cl⁻ (mg/l) | $SO_4^{2-}$ (mg/l) | pH | Conductivity (μs/cm) | Total solution solids (mg/l) |
|---|---|---|---|---|---|---|---|---|
| A | 10 | 13 | 15 | 12 | 9 | 7.0 | 90 | 55 |
| B | 20 | 33 | 35 | 9 | 10 | 7.0 | 102 | 68 |
| C | 60 | 78 | 81 | 15 | 25 | 7.4 | 157 | 171 |
| D | 121 | 154 | 160 | 12 | 40 | 7.7 | 222 | 352 |
| E | 240 | 370 | 328 | 70 | 115 | 7.5 | 990 | 707 |

In Table 1, calcium hardness, total alkalinity and total hardness are based on $CaCO_3$, and are measured according to standards GB/T6910-2006, GB/T15451-2006 and GB/T15452-2006, respectively; Cl⁻ according to standard GB/T15453-2008 Determination; $SO_4^{2-}$ according to the standard GB/T14642-2009; pH according to the standard GB/T6920-1986; conductivity according to the standard GB/T6908-2008; total solution solids according to the standard GB/T14415-2007.

Establishing five sets of control samples, whose components include sodium carboxymethyl inulin (referred to as NaCMI), polyepoxy succinic acid (referred to as p(ESA)), and acrylic acid-epoxy succinic acid polymer (referred to as p(AA-ESA)), the binary compound of polyepoxy succinic acid and sodium carboxymethyl inulin (referred to as p(ESA)+NaCMI), and the binary compound of acrylic acid-epoxy succinic acid polymer and sodium carboxymethyl inulin (referred to as p(AA-ESA)+NaCMI). Putting the above graft polymers I~IX and the five sets of control samples into the test water, and the effective concentration of each graft polymer and control sample is 5 mg/l in a constant temperature water bath of 80±1° C. Using the volumetric flask method to stand for 10 h. After cooling, sampling and analyzing the remaining $Ca^{2+}$ concentration in the water to calculate the scale inhibition rate. Part of the test results are shown in Table 2.

Fixing multiple identical No: 20 high-quality carbon steel test pieces on the hanging instrument. Then the test pieces were completely immersed in the test water A~E added with each graft polymer I~IX and different control samples at a constant temperature of 40±1° C., kept rotating at 75 rpm for 72 h. Recording the weight of the test piece before and after the test, and calculating the average corrosion rate. Part of the test results are shown in Table 2.

TABLE 2

Scale and corrosion inhibition test results of graft polymers I~IX and control

| Controls or examples/ test water | Scale inhibition rate (%) | Average corrosion rate (mm/a) |
|---|---|---|
| NaCMI/C | 35.5 | 0.225 |
| p(ESA)/D | 68.2 | 0.136 |
| p(AA-ESA)/A | 75.8 | 0.109 |
| p(ESA) + NaCMI/B | 73.6 | 0.107 |
| p(AA-ESA) + NaCMI/E | 87.1 | 0.081 |
| Graft polymer I/D | 96.8 | 0.016 |
| Graft polymer II/A | 98.7 | 0.021 |
| Graft polymer III/E | 97.9 | 0.015 |
| Graft polymer IV/C | 98.5 | 0.019 |
| Graft polymer V/E | 97.2 | 0.020 |
| Graft polymer VI/D | 98.1 | 0.018 |
| Graft polymer VII/B | 98.8 | 0.019 |
| Graft polymer VIII/A | 98.4 | 0.016 |
| Graft polymer IX/C | 97.6 | 0.017 |

Regarding the preparation of the control sample in Table 2, NaCMI was purchased from Italmatch Chemicals S.p.A with a carboxymethyl substitution degree of 2.0; p(ESA) was purchased from Hebei Synergy Environmental Protection Technology Co., Ltd. with a solid content of 40%; p(AA-ESA) is self-made in the laboratory, the active substance mass percentage is 50%. Obviously, the carboxymethyl inulin graft polymer scale and corrosion inhibitors I to IX prepared by the present invention have significantly superior scale and corrosion inhibition properties, compared with single NaCMI or p(ESA), or binary copolymer p(AA-ESA), and the compound of p(AA-ESA) and NaCMI.

In summary, the beneficial effect of the technical scheme proposed in the present invention is: it has excellent scale inhibition and corrosion inhibition properties; the monomers are cheap and easily available; the reaction conditions are mild and easy to control; at the same time, the monomer raw materials don't contain phosphorus and nitrogen, and are environmentally friendly.

It is to be understood, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. The main chain of the carboxymethyl inulin graft polymer scale and corrosion inhibitor consists of the following repeating unit (I):

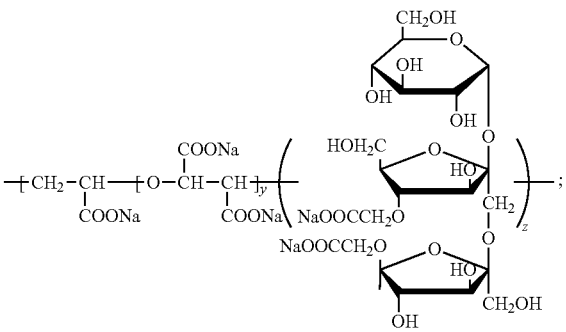

in the repeating unit (I), x:y=(20~80):(20~80); the range of z is from 2 to 70, the degree of carboxymethyl substitution is from 1.5 to 2.5; the repeating unit (I) includes sodium acrylate monomer, sodium epoxy succinate monomer and sodium carboxymethyl inulin, and the molar ratio of the sodium acrylate monomer and sodium epoxy succinate monomer is (30~70):(40~70); in the sodium carboxymethyl inulin, the range of z is from 10 to 60, and the degree of carboxymethyl substitution is from 1.7 to 2.2.

2. The preparation method of the carboxymethyl inulin graft polymer scale and corrosion inhibitor according any one of claim 1, including the following steps:
    dissolving the sodium carboxymethyl inulin in water to obtain sodium carboxymethyl inulin aqueous solution, dissolving the emulsifier in the oil phase solvent and mixing with the sodium carboxymethyl inulin aqueous solution, and then mixing with $N_2$ to remove $O_2$ for 30 min;
    after raising the temperature to the initiation temperature, the initiator is added to initiate the reaction for 60 min, and then the temperature is raised to the grafting temperature, and the sodium acrylate monomer and the sodium epoxy succinate monomer are added, and the graft polymer emulsion is obtained after 4~6 h of reaction;
    the graft polymer emulsion is subjected to post-treatment, to obtain a carboxymethyl inulin graft polymer scale and corrosion inhibitor;
    the molar ratio of the sodium acrylate monomer to the sodium epoxy succinate monomer is (20~80):(20~80), the sugar chain polymerization degree of the sodium carboxymethyl inulin is from 2 to 70, and the degree of carboxymethyl substitution is from 1.5 to 2.5.

3. The preparation method of the carboxymethyl inulin graft polymer scale and corrosion inhibitor according to claim 2, the emulsifier is one or a mixture of oleic acid, sodium oleate, calcium oleate, magnesium oleate, Span-type emulsifier, Tween-type emulsifier and OP-type emulsifier; the oil phase solvent is one or a mixture of toluene, xylene, liquid paraffin and white oil.

4. The preparation method of the carboxymethyl inulin graft polymer scale and corrosion inhibitor according to claim 2, the initiation temperature is 30~50° C., the grafting temperature is 30~60° C.

5. The preparation method of the carboxymethyl inulin graft polymer scale and corrosion inhibitor according to claim 2, the initiator is one or a mixture of potassium persulfate, ammonium persulfate, urea, benzoyl peroxide, azobisisobutyronitrile, sodium dithionite, phosphotungstic heteropolyacid-chromium nitrate complex.

6. The preparation method of the carboxymethyl inulin graft polymer scale and corrosion inhibitor according to claim 5, the initiator is a ternary complex composed of potassium persulfate, urea, phosphortungstic heteropolyacid-chromium nitrate complex, and the molar ratio of potassium persulfate, urea and phosphortungstic heteropolyacid-chromium nitrate complex is (5~15):(5~15):(1~6).

7. The preparation method of the carboxymethyl inulin graft polymer scale and corrosion inhibitor according to claim 2, in the step of adding sodium acrylate monomer and sodium epoxy succinate monomer, the volume ratio of oil phase to water phase in the solution is 1.2:1.

8. The preparation method of the carboxymethyl inulin graft polymer scale and corrosion inhibitor according to claim 2, the post-treatment specifically includes the following steps:

the graft polymer emulsion is repeatedly washed in acetone or ethanol and dried under vacuum at 40~60° C. to obtain the crude product;

the crude product is repeatedly extracted to remove impurities by using the volume ratio of 6:4 glycol/glacial acetic acid mixture, and then vacuum-dried and crushed to obtain the carboxymethyl inulin graft polymer scale and corrosion inhibitor.

\* \* \* \* \*